United States Patent
Muller

[15] 3,684,822
[45] Aug. 15, 1972

[54] METHOD FOR CENTRALIZING THE FUNCTIONS OF SINGLE CURRENT-DOUBLE CURRENT CONVERTER CIRCUITS IN CENTRALLY CONTROLLED TELEPRINTER DIAL SWITCHING INSTALLATIONS

[72] Inventor: Henrik Muller, 8 Nonenhorstrasse 5/VI, Munich, 60, Germany

[22] Filed: Dec. 10, 1969

[21] Appl. No.: 883,803

[30] Foreign Application Priority Data

Dec. 11, 1968 Germany..........P 18 14 054.0

[52] U.S. Cl. ..............................................178/4.1 R
[51] Int. Cl. ..............................................H04l 11/02
[58] Field of Search................................178/4.1 R

[56] References Cited

UNITED STATES PATENTS

3,519,743   7/1970   Herter ....................178/4.1 X
2,820,089   1/1958   Schouten et al. ........178/4.1 X

Primary Examiner—Kathleen H. Claffy
Assistant Examiner—Thomas W. Brown
Attorney—Birch, Swindler, McKie & Beckett

[57] ABSTRACT

A method is described for the conversion of single current to double current signals in teleprinter dial switching installations having a central control. The control system operates to control the converter by generating operating cycles in response to incoming polarity changes. Each new polarity is forwarded, and connection supervision signals are generated for the control of each converter circuit in the system. In the disclosed embodiment the system utilizes a converter circuit for each subscriber.

7 Claims, 13 Drawing Figures

METHOD FOR CENTRALIZING THE FUNCTIONS OF SINGLE CURRENT-DOUBLE CURRENT CONVERTER CIRCUITS IN CENTRALLY CONTROLLED TELEPRINTER DIAL SWITCHING INSTALLATIONS

BACKGROUND OF THE INVENTION

It is known in prior art systems that single current-double current converter circuits required for teleprinter switching are generally assigned to each of the single current subscribers only as needed. In the recently developed time division multiplex data dial switching systems, however, it is necessary to permanently assign to each subscriber a converter circuit, and each of these converter circuits possess a connection supervision system which is well known to those skilled in the art. Problems have arisen in the use of such systems, and these problems will be discussed more fully hereinbelow with reference to FIGS. 1 and 2 of the drawings. In addition the objects of the invention set forth immediately below will be best understood by reference to those portions of the specification describing FIGS. 1 and 2 which in fact describe the prior art circuits and the problems found therein.

It is an object of this invention to provide a method which makes possible a further reduction in the cost of centralizing partial tasks of converter circuits in teleprinter systems.

This is achieved in the invention by providing at least one further operating cycle in the central control system for the converter circuit for detecting, as reflections, the polarity changes appearing during normal operation of the converter circuit, and for detecting the absence of reflections in the abnormal operation of the converter circuit at the outlet thereof. By this means, the reflections appearing in the normal operation in the form of polarity changes are suppressed, and signals corresponding to the reflections which should have but did not appear in the abnormal operation of the converter circuit are additionally generated in the form of polarity changes.

By using the method according to this invention, it is possible to obtain converter circuits which are of considerably lower costs as compared to the prior art circuits. This reduction of cost may be achieved due to the fact that the cost for components will be considerably reduced.

BRIEF DESCRIPTIONS OF THE DRAWINGS

The invention, along with its object and advantages, may be best understood by reference to a description to the prior art circuits and preferred circuits which utilize the method of this invention given hereinbelow in conjunction with the drawings in which:

FIGS. 2b and 2c are flow diagrams illustrating the processees in the central control system of FIG. 2a;

FIG. 3b is a flow diagram illustrating the processes occurring in the central control system of FIG. 3a;

FIG. 4b is a flow diagram illustrating the processes occurring in the central control system of FIG. 4a;

FIG. 5b is a flow diagram illustrating the processes occurring in the central control system of FIG. 5a;

DETAILED DESCRIPTION OF THE DRAWINGS

Figure 1:
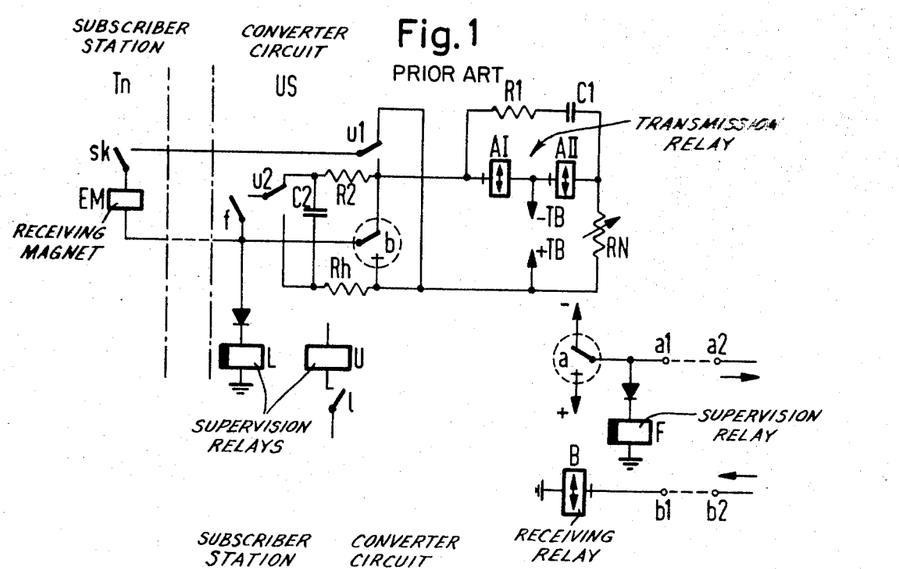
FIG. 1 is a schematic diagram of a known single current-double current converter circuit.

FIG. 1 schematically illustrates a prior art single current-double current converter circuit which may be used in teleprinter dial switching installation. The converter circuit US is assigned to a subscriber station Tn, of which only the transmission contact SK and the receiving magnet EM are shown. The converter circuit contains a telegraph transmission relay A, the first winding AI of which is arranged in the line circuit and the second winding of which is contained in a balancing network which contains a balancing network resistor RN. The double current signals to be transmitted are available at outlet a1 over the transmission contact a and will be communicated from the converter circuit on transmission line a2. Double current signal arriving on line b2 will reach, over inlet b1 of the converter circuit, a telegraph receiving relay B, which forwards these double current signals over its receiving contact b to subscriber station Tn as single current signals. In addition the converter circuit also contains transfer contacts u1 and u2, as well as a contact f. A resistor R1 and a capacitor C1 are connected in parallel with the two windings AI and AII of the transmission relay as well as being connected in series with the contact b. By this means, the circuit R1, C1, prevents the transmission relay from being influenced, i.e., from an open to a closed position or vice versa, during the movement of the contact b. It is necessary to connect the circuit comprising resistor R2 and capacitor C2 in parallel with contact b, because with each reception of a signal step (contact b being in the closed position) the line leading to the subscriber is short circuited, discharging the line. A renewed charging of this line begins with the reception of a separation step signal. With current flowing over the entire line again, it achieves only very slowly the value necessary to maintain the excitation of the transmission relay. In order to prevent the transmission relay from being influenced an appropriate charging current impulse is emitted over the capacitor C2 and the resistor R2 which guarantee the excitation of the transmission relay over its first winding until the line is charged to its final value. As connection supervision systems, relays F, L and U exist, which, as is known, satisfy specific time conditions. Relay F which supervises the position of transmission contact a has for this purpose a drop out delay time of 300 milliseconds, while relay L which supervises the condition of the line circuit has an increased delay time of about 50 milliseconds and a drop out delay time of approximately 600 milliseconds.

In rest condition a second winding AII of telegraph transmission relay A, which is arranged in the balancing circuit is start-polarity excited, i.e., transmission contact a is in the shown start-polar position. Connection supervision relays F, L and U are not excited. Accordingly, the contacts $f$, l, $u1$ and $u2$ are in the shown position. Due to the rest condition on the incoming line $b2$, telegraph receiving relay B is also start-polarity excited, i.e., the contact $b$ is also in the shown start-polar position. If a call desire emanates from the subscriber T$n$, the line current will be increased in such a way that the telegraph transmission relay A is stop-polarity excited over its first winding AI. At the same time, relay F will also be excited and a call criterion or signal is then available thereover. After detection of the call, a stop-polar pulse is sent back by this central control, which, over the incoming line $b2$, stop-polarity excites telegraph receiving relay B for a short period of time. Over the thereby actuated receiving contact b the line circuit is interrupted, which as is known is evaluated by the subscriber as a request to dial. If after dialing, the desired subscriber has been reached a stop polarity again reaches converter circuit US over incoming line $b2$, whereupon the receiving contact $b$ attains the stop-polar position. Now, connection supervision L having an increase time of about 50 milliseconds will also respond. At the same time, relay U is excited over contacts $u1$ and $u2$, whereby the subscriber loop is repoled and the teleprinter of the calling subscriber is connected. Because connection supervision relays F and 1, respectively, possess a drop out delay time of 300 milliseconds and 600 milliseconds, the release by the calling subscriber is recognized by the drop out of connection supervision relay F, and the release by the called subscriber is recognized through the drop out of connection supervision relay L.

Figure 2A:
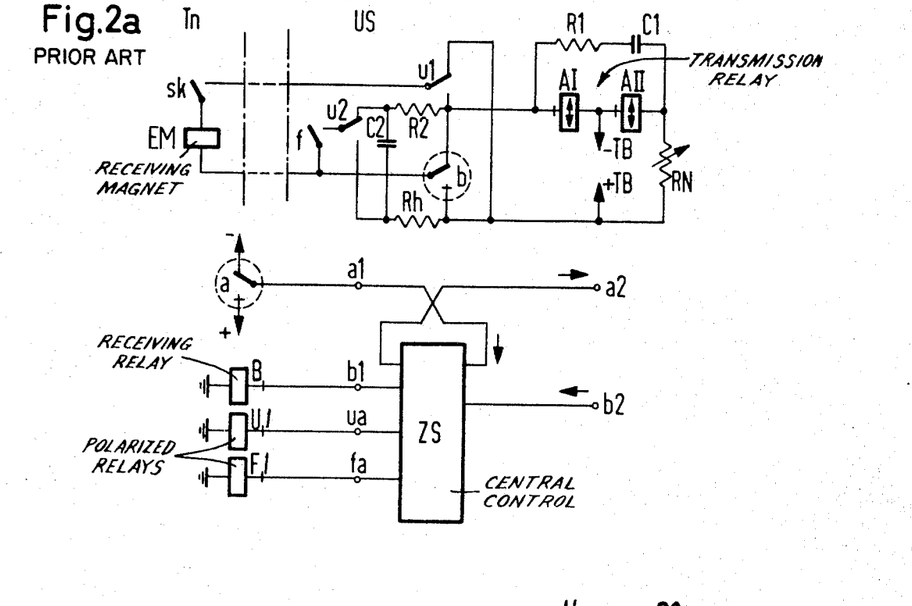
FIG. 2a is a schematic diagram of a converter circuit similar to that in FIG. 1 which additionally includes a known central control system for partially centralizing the operations of the converter circuit.

FIG. 2$a$ illustrates schematically a converter circuit similar to that in FIG. 1, but in which a portion of the tasks of the converter circuit are centralized to reduce costs. In such arrangements connection supervision criteria or signals are generated internally in the central control system through interrogation of the polarity stored on each line, and only the results are communicated to the individual converter circuits. By operating in this manner, connection supervision relay L, can be eliminated. Relays F1 and U1 are provided. These can be simple polarized relays which have to satisfy no time restrictions regarding closing and opening times.

In the FIG. 2$a$ embodiment the input side of a central control ZS is connected with an outlet $a1$ of the converter circuit US and with the incoming line $b2$. Outgoing as well as incoming polarity changes, are detected in the central control, stored and compared with existing conditions. The connection supervision criteria or signals obtained by the connection supervision relays in the converter circuit according to FIG. 1 are in this FIG. 2$a$ arrangement formed in the central control ZS and communicated over its outlets $ua$ and $fa$ to the converter circuits in question. Utilizing these latter signals the converter circuit will operate in a manner described hereinabove with reference to FIG. 1.

Figure 2B:
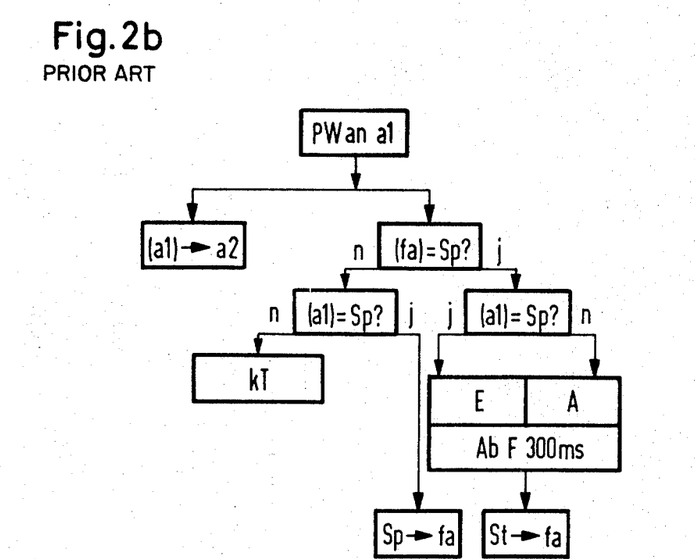
Figure 2C:
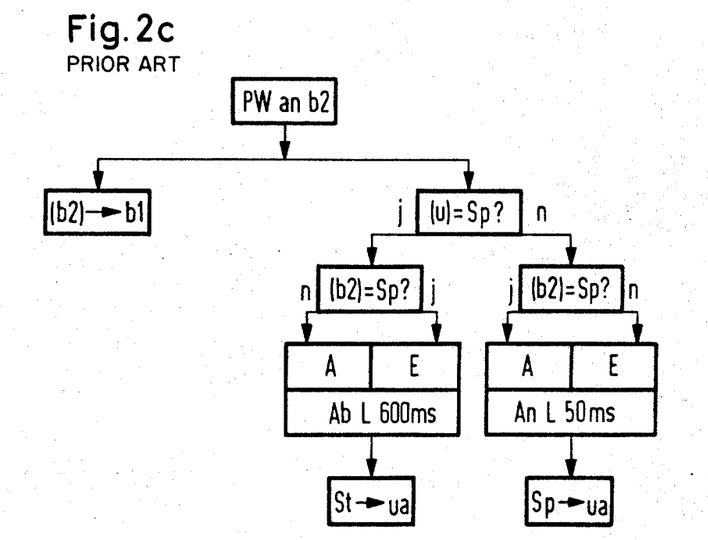

The flow diagrams in FIGS. 2$b$ and 2$c$ illustrate the processes by which the central control system in the FIG. 2$a$ circuit arrangement operate. Before considering these figures in detail, it will be necessary to explain the symbols used therein. In this connection the symbols used in FIGS. 3$b$, 4$b$ and 5$b$ will correspond to the symbols used in FIGS. 2$b$ and 2$c$. In the functional programs a positive decision is labelled with the letter $j$, and a negative decision is labelled with the letter $n$. For the expression "stop polarity" and "start polarity" the designations S$p$ and S$t$ are used, respectively. If, at the end of a program the arrangement remains inactive, this is indicated by the symbol KT. If, due to a program, the forwarding of a polarity change cannot take place, the definition KW for no forwarding is used. For the beginning and end of a delay time the designations A and E are used, respectively. The actions "increase" and "decrease" are symbolized by the designations A$n$ and A$b$, respectively. Expressions in parenthesis in the flow diagrams signify in each case that the polarity appearing at the appropriate inlet, which may be a start or stop polarity, is supervised.

In FIG. 2$b$ it may be seen that a polarity change PW appearing at outlet $a1$ of the converter circuit US is not only forwarded to the outlets $a2$ of the central control ZS, but is also evaluated, under the supervision of the drop out delay of connection supervision relay F1, for the generation of a signal which controls contact f in the converter circuit. In the same manner, as is shown in detail in FIG. 2$b$ a polarity change PW, appearing at inlet $b2$ of the central control ZS, is not only forwarded to the inlet $b1$ of the circuit, but is also evaluated under supervision of the increase and drop out delay of connection supervision relay L for the generation of a criterion which controls the transfer contacts $u2$ and $u1$ in conversion circuit US.

A further reduction in the costs of centralizing the converter tasks using the circuits described above is not possible due to the fact that the converter circuits must fulfill in addition to the mentioned tasks of reliably recognizing the connection supervision criteria, a further very important prerequisite. This latter prerequisite that a polarity change which is placed on the two wire lines in the direction towards the subscriber must not be reflected by the converter circuit in any form into the opposite direction. In known converter circuits a reflection of the polarity change into the opposite direction is always prevented by the arrangements of contacts $f$, $u2$ and $b$ when the converter circuit operates normally, i.e., when transmission contact sk is open in the rest and release condition and closed in the dial and writing condition. However, if the operation is not normal, i.e., if in the rest and release condition transmission contact $sk$ is closed and in the dial and writing condition open, the polarity changes are reflected in a reverse direction over transmission contact a with reverse polarity.

A description of the prior art circuit and the problems found therein having been given the method according to the invention will now be explained in more detail with reference to FIGS. 3–7. It should be noted that the circuits illustrated in these latter figs. are modifications of the prior art circuits discussed above so that in the description hereinbelow where a particular description is not given for the operation of a particular element, reference may be had to FIGS. 1 and 2 for an understanding of the operation of that element.

Figure 3A:
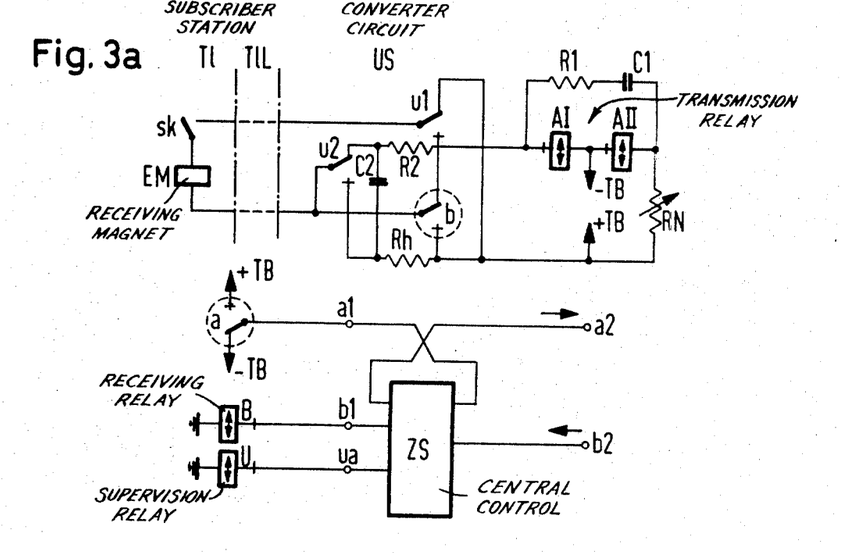
FIG. 3a is a schematic diagram of a first preferred embodiment of a converter circuit and central control system constructed to utilize the method of this invention.

The converter circuit of FIG. 3a which is suitable for the application of the method of this invention is mainly characterized by the fact that the contact f has been eliminated. Accordingly, central control ZS contains only outlets $b1$ and $ua$.

In order to recognize and surpress undesirable polarity changes, such as those generated by reflections, at outlet A1 of the converter circuit US for the purpose of supervision with regard to reflections a polarity change PW appearing at outlet $a1$ of the converter circuit is forwarded only to outlet $a2$ of the central control ZS upon a determination that the relative positions of the transfer contact $u1$ and $u2$ and receiving contact $b$ coincide, and only after the expiration of a specified delay time $\tau l$, the importance of which will be explained later. This additional operating cycle always runs in the central control system when the contact designated $f$ in FIGS. 1 and 2 would be open. For an explaination of the individual processees it is suitable to proceed from the assumption that the switching elements which control the contacts of the converter circuits and which in turn are controllable by central control, according to the connection supervision criteria, are bistable relays. Assuming this, one recognizes that the circuit arrangement of FIG. 3a corresponds to the circuit arrangement of FIG. 2a when the there existing contact $f$ is in the stop position.

Figure 3B:
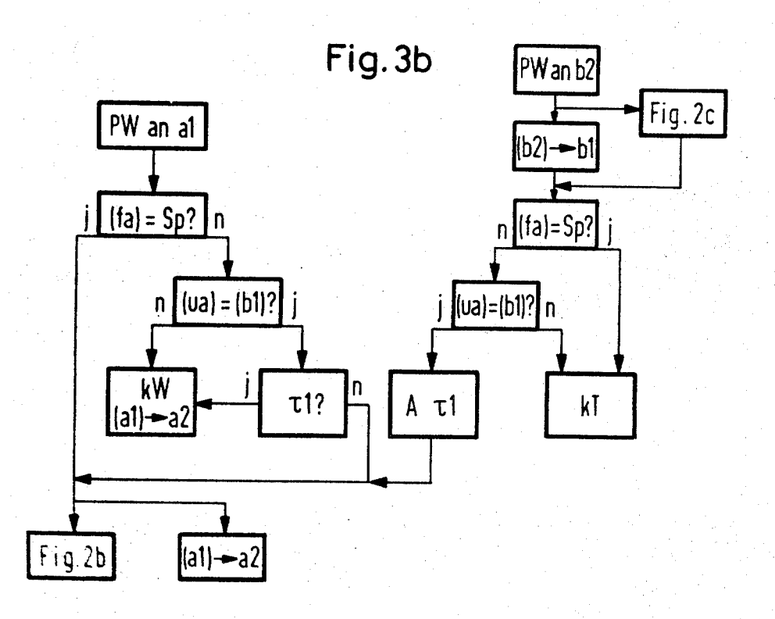

In order to eliminate contact f from the converter circuit in FIG. 2a and to eliminate the outlets fa in the central control ZS, the additional operating cycle required to avoid inadmissible reflections, as shown in the left hand portion of FIG. 3b, is released by determination that the contact $f$ would be in a start position, and that the connection supervision criteria for evaluating a call is not present. This polarity is available internally in the central control. Only in this case can a polarity change result at outlet A1 of the converter circuit through a reflection. Thus, an additional operating cycle in central control ZS need only be started in the rest and in the release position. In a converter circuit of FIG. 3a a polarity change not effected by this subscriber can only appear if the two transfer contacts $u1$ and $u2$ and the receiving contact $b$ are not in the same relative position. If this is the case, a polarity change appearing at outlet $a1$ is always a polarity change brought about by reflections and, of course, such a change must not be forwarded. In FIG. 3b this is indicated by the words "no forwarding" at the end of the additional operating cycle in the central control.

It is possible, however, that if this position has just been reached, the polarity change appearing thereafter within a time period determined by input tolerances is still a polarity change caused by a reflection. As this too must not be forwarded, the already mentioned delay time $\tau 1$, exists which is started when conversion contact $u1$ and $u2$ and the receiving contact $b$ reach a coinciding position. This is recognized by supervision of the polarity changes at inlet $b2$ of central control ZS, whereby, again, the criterion is that the contact $f$ would be in a start position. This functional program is indicated in the right hand portion of FIGS. 3b. It is to be recognized that delay time $\tau 1$ is started when at the two outlets $ua$ and $b1$ of central control ZS the same polarity appears.

If it is determined by central control ZS that contact $f$ is in a stop position, there exists no reason to start an additional operating cycle, because then the processees occur which were described hereinabove with reference to FIG. 2. This prerequisite is always the case for the converter circuit according to FIG. 3a for the dial or writing condition.

It has already been pointed out that the condition which is characterized in the rest and release condition by the open transmission contact, and in the dial writing condition by the closed transmission contact can in each case be considered to be the normal condition. If this is not the case, there also may occur in a customary converter circuit polarity changes produced by reflections upon the actuation of the transfer contacts and the receiving contact. It is known to evaluate these reflections as criteria for abnormal operations. The converter circuit described with the aid of FIG. 3a contains no operating case wherein such polarity changes caused by reflection must be balanced. For converter circuits at still further reduced costs, however, a possibility must be provided for additionally producing such reflections.

Through a further development of the method according to this invention the centralization cost can be further reduced for each converter circuit if the manner of treating reflections described in FIG. 3b and a further additional operating cycle are provided in central control. This latter cycle, as described, is expressed in that in certain cases, i.e., for the abnormal case of the dial and writing condition, additional polarity changes are produced as reflections. The generation of reflections is achieved through the fact that in the central control an additional polarity change is produced and is forwarded to the outlet connected with the continuing-on line if in the dial and writing condition the polarity line at the outlets of the central control connected with the converter circuit does not coincide. To determine the dial and writing condition there is available internally the polarity of which, in a well known manner, is provided to form the control criterion for contact $f$. Accordingly, the dial and writing condition is always characterized by the fact that contact $f$ would be in a stop position.

Figure 4A:
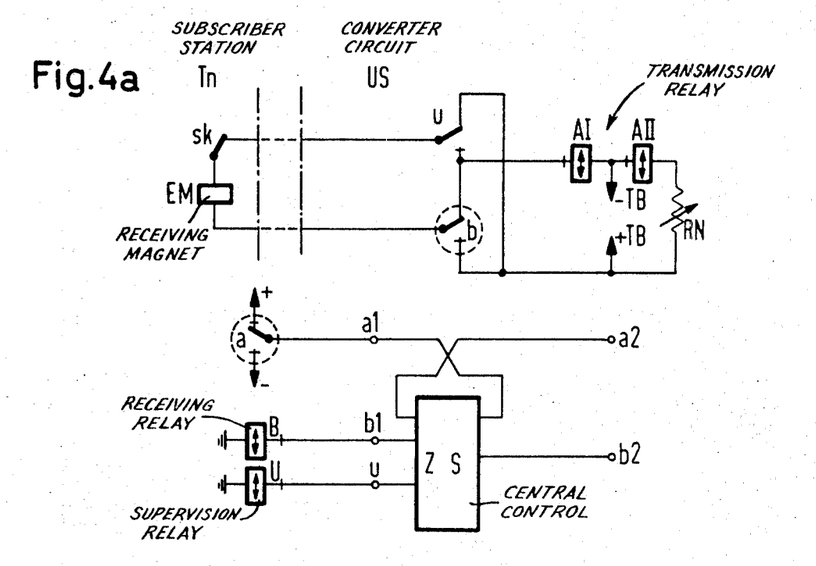
FIG. 4a is a schematic diagram of a second preferred embodiment of a converter circuit and central control system constructed to utilize the method of this invention.

In the FIG. 4a circuit the converter circuit contains in addition to the telegraph transmission relay A and the transmission contact a only a conversion contact $u$ and the receiving contact $b$. Polarity changes at outlet $a1$ of the converter circuit US and at inlet $b2$ of the central control ZS are evaluated and recognized therein. The converter circuits shown in FIG. 3a, wherein not only the holding circuit for the telegraph transmission relay, but also the RC elements have been eliminated, requires neither in the rest nor in the release condition any special expenditures in central control ZS. In these instances it is guaranteed by transmission contact sk, which is open in the normal condition, that a polarity change at outlet a1 of converter circuit US is not caused by a reflection. Accordingly, a polarity change appearing at outlet a1 of the converter circuit is always then forwarded immediately to the outlet of the central control when contact f is in a start position. In an abnormal case, as described above, contact f would be in a stop position. In this case a polarity change is only forwarded when contact u and b are in the same relative position, after expiration of a certain delay time 1. In this connection it is checked whether the polarity appearing at outlets u and b1 at the central control coincide. Only in these two cases can the polarity change be a genuine one, i.e., not a polarity change caused by reflections. In order to avoid that immediately after the reaching of a coinciding position of both contacts u and b a polarity change is issued, which perhaps was still generated by reflections, again delay time $\tau 1$ is used for supervising polarity changes at inlet b2 of the central control. These processees which take place during the dial and writing condition correspond to the program described in FIG. 3b for the rest and release condition.

Figure 4B:
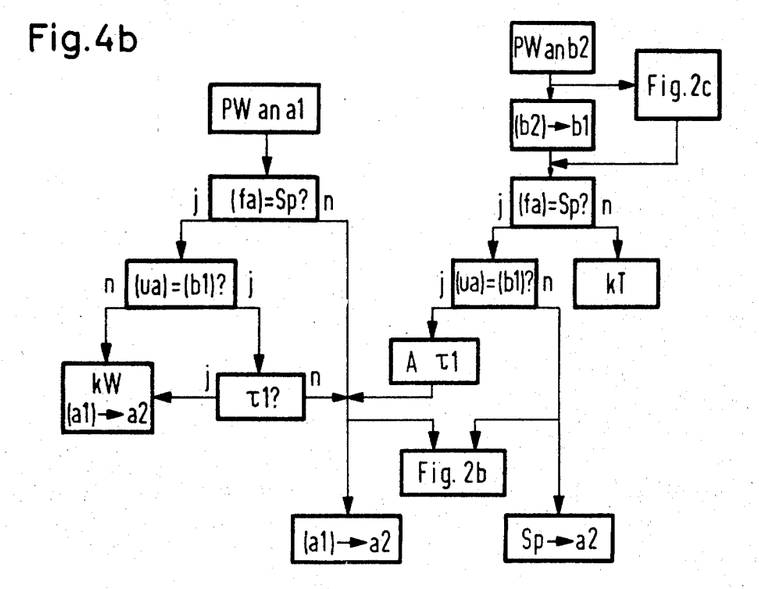

As was the case for the rest and release condition, there is also possible for the dial and writing condition a normal operation and an abnormal operation. In the latter case, when contact sk is open, a polarity change must be generated additionally. For an explanation of the functions occurring in the dial and writing condition reference is made to FIG. 4b. When contact sk is closed, contact f would be in a stop position as described. In this case a polarity change appearing at outlet A1 of converter circuit US is forwarded to the outlet a2 of central control only if, after the expiration of these delay time $\tau 1$, contact u and b coincide in their relative positions. The derivation of the delay time takes place in the already described manner. This is shown in FIG. 4b. Only if contact f were in the stop position would the contacts u and b coincide and, will the delay time start to run.

For abnormal operations a polarity change appearing at inlet b2 of central control is always reflected in the form of an additional polarity change if the two contacts u and b do not coincide in their position. Thus, an additional operating cycle always commences when at inlet b2 of central control a polarity change appears, or contact u is placed into another position and contact f would be in a stop position. In addition the two contacts u and b would not coincide in their position. In this instance, a stop-polar pulse is transmitted to outlet a2 of the central control ZS. If, however, in the meantime contacts u and b have again resumed the same position, then, after the expiration of the delay time, the polarity then appearing at outlets A1 of the converter circuit is forwarded to outlet a2 of the central control ZS.

Figure 5A:
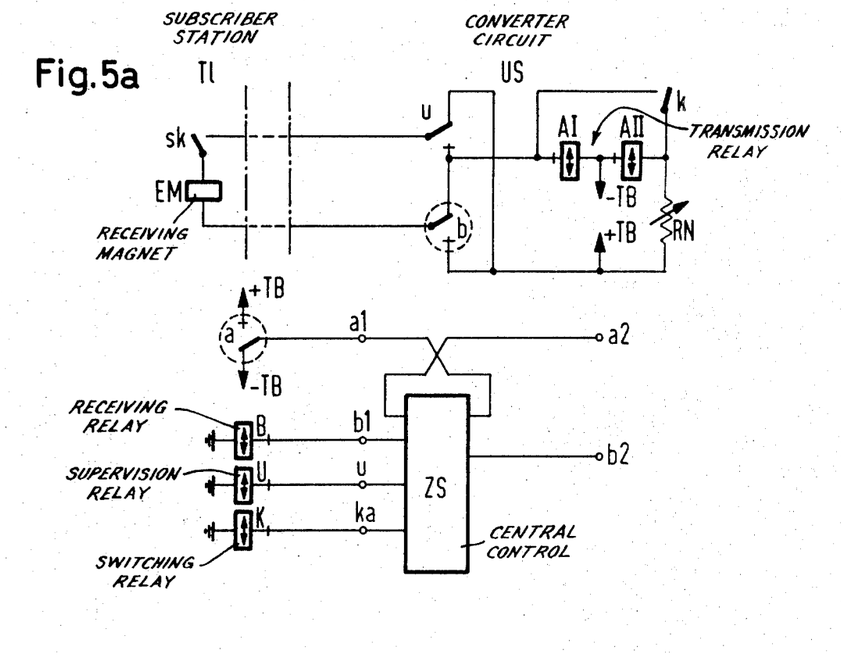
FIG. 5a is a schematic diagram of a third preferred embodiment of a converter circuit and central control system constructed to utilize the method of this invention.

The circuit in FIG. 5a is designed so that principally no reflection polarity changes occur. In this circuit the two windings of the telegraph transmission relay AI and AII can be bridged by an additional controllable switching element. In this embodiment the switching element is preferably a contact k, but any suitable means may be used. If contact k is in the stop-polar position, the telegraph transmission relay remains always in the previously occupied position. The criterion for the controlling contact k is made available by central control ZS over a further outlet ka. However, there is the requirement that contact k is closed in each case simultaneously with the short circuiting of the line circuit, and is opened upon reactuation of the line only after the equalization processes have faded away. For this purpose a further delay time $\tau 2$ is provided.

Figure 5B:
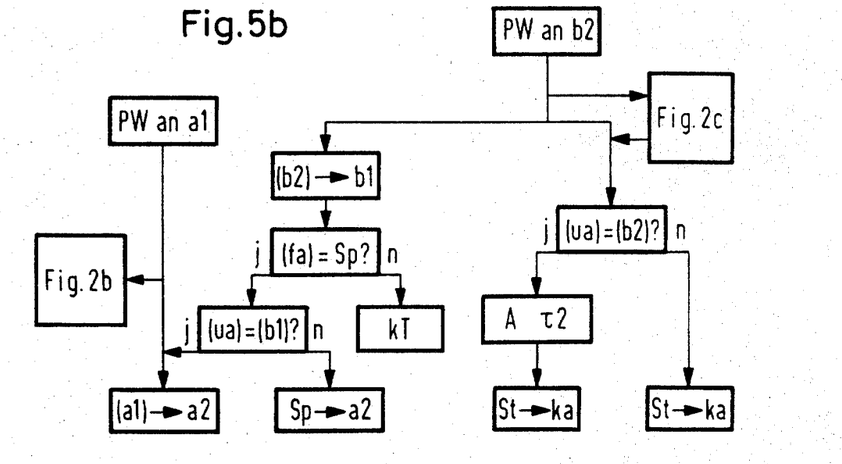

FIG. 5b shows the functional program for the formation of the criterion controlling contact k. A polarity change appearing at inlet b2 of the central control ZS is not only conveyed to inlet b1 of the converter circuit, but it is also at the same time available for the derivation of the control criterion for contact k. To describe the mode of action it is again assumed that over control outlet ka of central control a bistable relay K is controllable. If the positions of of contacts u and b do not coincide, a stop polarity immediately arrives at outlet ka of central control ZS whereby contact k is controlled into a stop-polar position. If, however, the coinciding position of contacts u and b is found, the recontrolling of contact k into start-polar position is only initiated after a delay time $\tau 2$.

Figure 6:
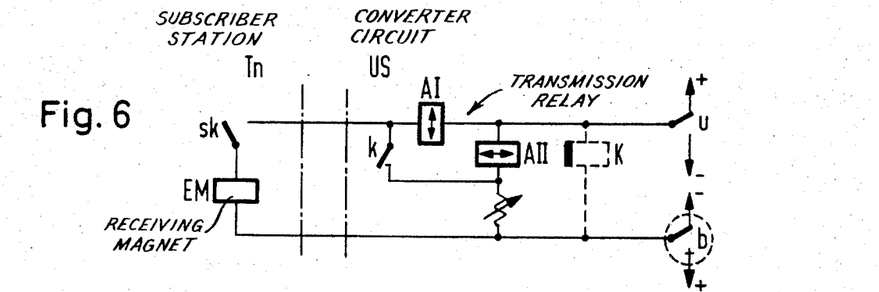
FIG. 6 illustrates a fourth preferred embodiment of a circuit constructed to utilize the principle of this method in which the transmission relay of the converter circuit has a winding thereof in the line circuit.

FIG. 6 illustrates a circuit in which telegraph relay A is arranged with its first contact A1 in the line circuit with the resulting advantage that contact u and b can be switched in the same manner as double current contacts of the four wire line. In this circuit when contact u is in a start polar position, a polarity change appearing in outlet a1 of the converter circuit US is forwarded, inverted, to outlet a2 of central control. A further possibility for the derivation of the control criterion for contact k resides in the fact that response-delayed relay is controlled directly over the position of contact u and b. This can take place, for example, over the relay designated K, blackened in FIG. 6.

Figure 7:
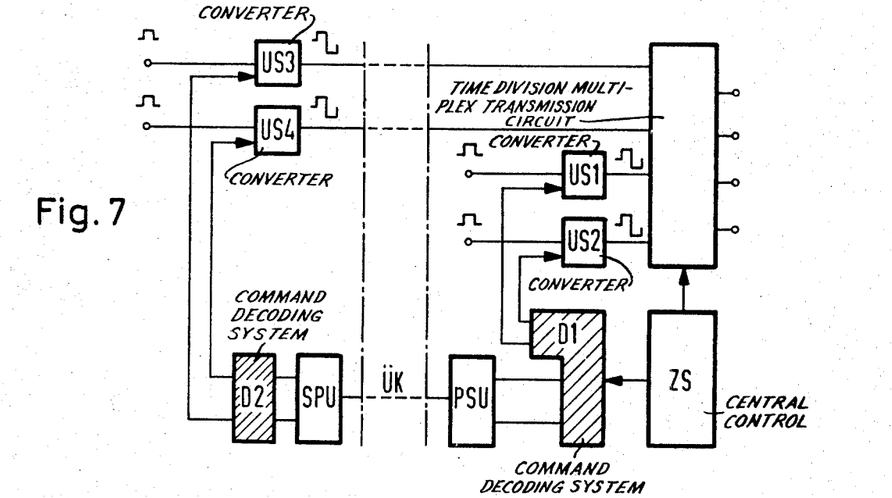
FIG. 7 illustrates a fifth preferred embodiment of a circuit constructed to utilize the method of this invention in which the central control system is spatially located from converter circuit.

FIG. 7 illustrates an arrangement wherein the converter cirucit and the central control are spatially separated. That is, the converter circuits are remotely controlled over a transmission channel. In this figure central control ZS is connected over command decoding system D1 with the converter circuits US1 and US2, and over transmission channel UA and command decoding system D2 with the converter circuits US3 and US4 of a long distance subscriber connection group.

Figure 8:
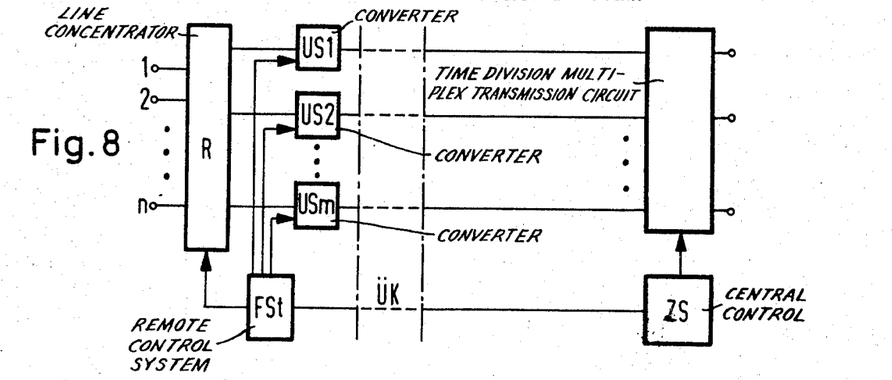
FIG. 8 illustrates a sixth preferred embodiment of a circuit constructed to utilize the method of this invention in which subscribers are connected to the switching systems over a remotely controlled concentrator installation and in which the transmission channel is used for controlling the concentrator.

In FIG. 8 a circuit arrangement is illustrated wherein the subscribers are connected to the switching system over a remotely-controlled conductor installation. In this circuit the transmission channel which is present for controlling the concentrator may be used for the transmission of the control criteria for the converter circuits. The concentrator R is already connected over remote control system FSt and transmission channel UK with the central control. However, the criteria necessary for the controlling of the converter circuits can then be transmitted from the central control over a transmission channel UK.

It will be apparent to those skilled in the art that the embodiments utilizing the method of the invention described hereinabove are only exemplary and that many different types of circuit arrangements may be utilized in the scope of the appended claims.

WE CLAIM:

1. A method for controlling single current - double current converter circuits in teleprinter dial switching installations wherein a converter circuit is used for each subscriber with a central control comprising the step of:

generating operating cycles in said central control (ZS) in response to incoming polarity changes, said operating cycles being utilized for forwarding a signal responsive to each said incoming polarity change and for generating supervision signals for controlling each of said subscriber converter circuits, generating at least one further operating cycle in said central control for centralizing the functions of each said converter circuit (US), for detecting polarity changes appearing as reflections during the normal operation of each said converter circuit at a first outlet ($a1$) thereof and for detecting the absence of reflections at said outlet during the abnormal operation of each said converter circuit, said further operating cycle being utilized for suppressing reflections occurring during normal operation, said reflections being in the form of polarity changes and generating polarity changes for said absent reflections which should have, but did not appear during abnormal operation.

2. The method defined in claim 1 wherein:

said at least one further cycle is generated, when a connection supervision signal for evaluating a call (stop polarity at outlet $fa$, FIG. 2b) is not present, and comprising the additional steps of:

forwarding to a first outlet ($a2$) of said central control a polarity change appearing at said first outlet of said converter only upon determination of coinciding polarities at a pair of second outlets ($b1, ua$) connecting said converter circuit to said central control after expiration of a first predetermined delay period.

3. The method defined in claim 1 wherein:

first and second further operating cycles are generated, said first further operating cycle being utilized for suppressing polarity changes at said second outlet of said central control, said second further operating cycle being utilized for generating additional polarity changes at said second outlet, said first and second operating cycles being generated responsive to the presence of a connection supervision criterion for evaluating a call (stop polarity at outlet $fa$, FIG. 2b), and comprising the additional steps of:

forwarding, responsive to said first operating cycle, to a first outlet of said central control a polarity change appearing at said first outlet of said converter only upon determination of coinciding polarities at a pair of second outlets ($b1, ua$) connecting said converter with said central control, and upon expiration of a predetermined delay time, and conveying to said first outlet of said central control, responsive to said second operating cycle, an additional polarity change (stop polarity), only upon determination of non-coinciding polarities at said second outlets, while upon determination of subsequent coinciding polarities at said second outlets, the polarity then appearing at said first outlet of said converter circuit arrives after expiration of a first predetermined delay time at said first outlet of said central control.

4. The method defined in claim 3 wherein said predetermined delay time is initiated through supervision of the polarity appearing at said second outlets.

5. The method defined in claim 2 wherein said step of generating a further operating cycle comprises:

generating a first further operating cycle, generating a signal actuating a switching element (k) closing a transmission relay (AI, AII) in said converter responsive to said first cycle and upon determination of non-coinciding polarities at an inlet of said central control and one of a pair of second outlets (b1, ua) connecting said central control to said converter, said switching element being opened upon determination of coinciding polarities after expiration of a second predetermined delay, said second delay being the time necessary for initiation and equalization processes on the line between said subscriber and said converter circuit, generating a second further operating cycle, forwarding the polarity at said first outlet of said converter to said first outlet of said central control responsive to said second cycle and responsive to one of a change in polarity at said inlet of said central control or a position change in a transfer contact (u) in said converter circuit and only when a connection supervision criterion for evaluating a call and coinciding polarities exist at said second outlets, and transmitting a stop polarity to said first outlet of said central control upon determination of a non-coinciding polarity at one of said second outlets.

6. The method defined in claim 5 wherein signals formed in said central control for controlling said converter are transmitted over a channel (UK) to spatially remote converter circuits (US3, US4).

7. The method defined in claim 6 wherein said channel is used additionally for transmitting control signals to a concentrator installation (R).

* * * * *